United States Patent [19]

Kim et al.

[11] Patent Number: 5,285,505
[45] Date of Patent: Feb. 8, 1994

[54] METHOD AND APPARATUS FOR IMPROVING PROTOTYPES OF SIMILAR CHARACTERS IN ON-LINE HANDWRITING RECOGNITION

[75] Inventors: Joonki Kim, White Plains; George J. Leibman, Mount Kisco; Charles C. Tappert, Ossining, all of N.Y.

[73] Assignee: International Business Machines Corporation, Armonk, N.Y.

[21] Appl. No.: 667,917

[22] Filed: Mar. 11, 1991

[51] Int. Cl.⁵ .................. G06K 9/62; G06K 9/46; G06K 9/50
[52] U.S. Cl. ........................ 382/13; 382/14; 382/23; 382/25; 395/151
[58] Field of Search ......... 382/14, 15, 11, 21, 382/23, 25, 41, 47, 13, 37, 38, 34; 395/150, 151, 110

[56] References Cited

U.S. PATENT DOCUMENTS

| | | | |
|---|---|---|---|
| 3,755,780 | 8/1973 | Sammon et al. | 382/37 |
| 3,967,241 | 6/1976 | Kawa | 382/38 |
| 4,030,068 | 6/1977 | Banz | 382/38 |
| 4,491,965 | 1/1985 | Yoshimura | 382/57 |
| 4,561,105 | 12/1985 | Crane et al. | 382/13 |
| 4,573,196 | 2/1986 | Crane et al. | 382/13 |
| 4,654,873 | 3/1987 | Fujisawa et al. | 382/9 |
| 4,718,102 | 1/1988 | Crane et al. | 382/13 |
| 4,731,857 | 3/1988 | Tappert | 382/9 |
| 4,754,489 | 6/1988 | Bokser | 382/40 |
| 4,785,391 | 11/1988 | Apley et al. | 395/150 |
| 5,121,441 | 6/1992 | Chefalas et al. | 382/13 |

OTHER PUBLICATIONS

"Global Prototype Establishment Procedure for Handwritten Character Recognition", IBM Technical Discl. Bulletin, vol. 31, No. 9, Feb. 1989 pp. 114–116.

"Word Processing with On-line Script Recognition", IEEE Micro., vol. 4, pp. 36–43, Oct. 1984, W. Doster et al.

"On-line Recognition of Handwritten Characters Utilizing Positional and Stroke Vector Sequences", Proc. 4th Int. Jt. Conf. Pattern Recognition pp. 813–815, Nov. 1978, by K. Ikeda et al.

"Adaptive On-line Handwriting Recognition", Proc. 7th Int. Conf. Pattern Recognition, Proc. 7th Int. Conf. Pattern Recognition, pp. 1004–1007, 1984 by C. Tappert.

"Speed, Accuracy, Flexibility Trade-offs in On-line Character Recognition" IBM Research Report RC13228, Oct. 1987 by C. Tappert.

"Stroke-number and Stroke-order Free On-line Character Recognition by Selective Stroke Linkage Method", T. Wakahara et al. Proc. 4th ICTP, pp. 157–162, 1983.

*Primary Examiner*—David K. Moore
*Assistant Examiner*—Michael Cammarata
*Attorney, Agent, or Firm*—Perman & Green

[57] ABSTRACT

A method, and apparatus for accomplishing same, of providing character prototypes for use by a handwriting character recognition system 10. A first method includes a first step of providing a first handwritten character; a second step of copying the first character to provide a second character; and a third step of modifying the second character to (a) emphasize dissimilarities between the second character and the first character and to (b) de-emphasize similarities between the second character and the first character. A second method includes a first step of providing a first handwritten character and a second handwritten character, the first and the second handwritten characters each being comprised of a plurality of points. A second step of the method matches corresponding points between the first character and the second character. A third step of the method processes pairs of matching points to separate one from another each point of the matching pair by an amount proportional to an initial separation between each matched corresponding point, so as to emphasize dissimilarities between the first character and the second character.

10 Claims, 2 Drawing Sheets

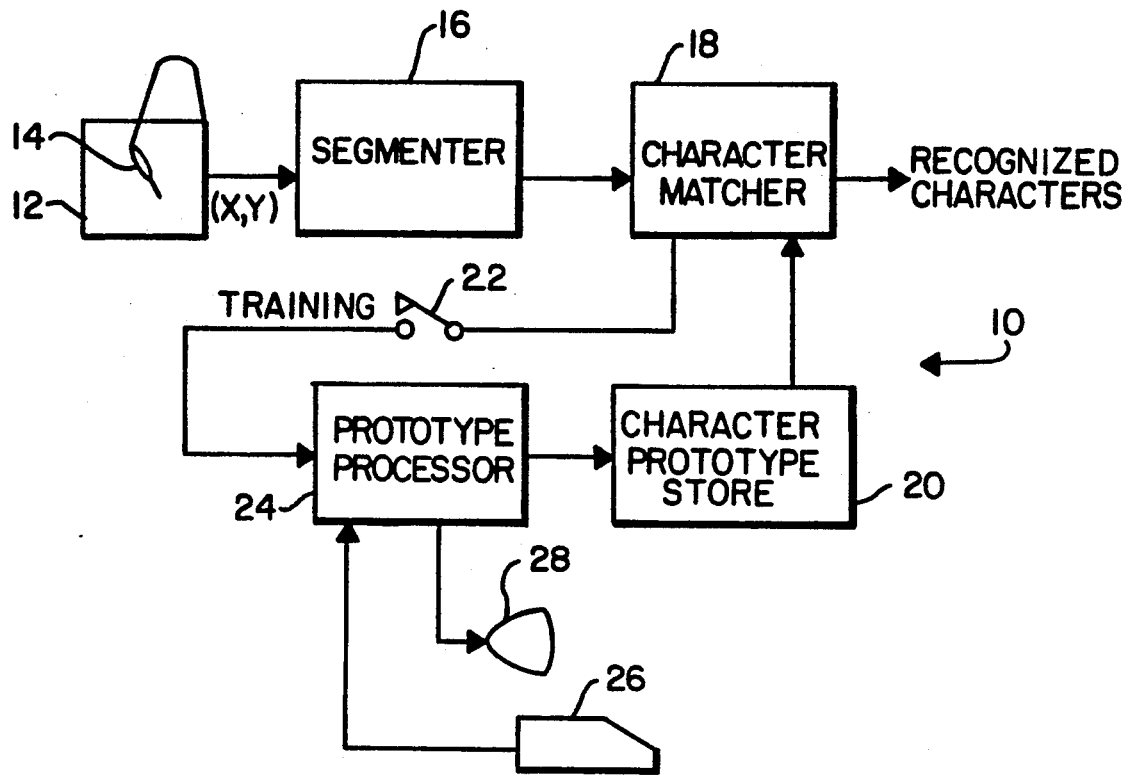

METHOD AND APPARATUS FOR IMPROVING PROTOTYPES OF SIMILAR CHARACTERS IN ON-LINE HANDWRITING RECOGNITION

FIELD OF THE INVENTION

This invention relates generally to handwriting recognition systems and, in particular, to methods and apparatus for optimizing a set of character prototypes used for matching against an unknown input character.

BACKGROUND OF THE INVENTION

Many on-line, handwriting recognition systems employ curve matching methods to match an unknown character against prototype, or template, characters. Examples of such systems are described in the following articles: W. Doster and R. Oed, "Word processing with on-line script recognition," IEEE Micro., vol. 4, pp. 36-43, October 1984; K. Ikeda, T. Yamamura, Y. Mitamura, S. Fujiwara, Y. Tominaga, and T. Kiyono, "On-line recognition of handwritten characters utilizing positional and stroke vector sequences," Proc. 4th Int. Jt. Conf. Pattern Recognition, pp. 813-815, November 1978; C.C. Tappert, "Adaptive on-line handwriting recognition," Proc. 7th Int. Conf. Pattern Recognition, pp. 1004-1007, 1984; C.C. Tappert, "Speed, accuracy, flexibility trade-offs in on-line character recognition," IBM Research Report RC13228, October 1987; and T. Wakahara and M. Umeda, "Stroke-number and stroke-order free on-line character recognition by selective stroke linkage method," Proc. 4th ICTP, pp. 157-162, 1983. In general, the recognition accuracy of such prototype-based handwriting recognition systems is a function of the quality of the prototypes.

One problem encountered in on-line handwriting recognition is the discrimination of similarly-shaped handwritten characters, such as A-H, h-k, g-y, etc. In that known curve matching methods weigh all portions of the curves of characters equally, non-essential portions may cause errors. In particular, with curve matching methods an unimportant feature or portion of the character, such as the shape of the descender or tail of "g" and "y", may cause recognition errors.

The following U.S. and Japanese Patents all teach various aspects of handwriting recognition systems.

U.S. Pat. No 4,561,105, issued Dec. 24, 1985, entitled "Complex Pattern Recognition Method and System" to Crane et al. describes an on-line character recognition system that uses template or model strokes (col. 3, lines 1-52).

U.S. Pat. No. 4,573,196, issued Feb. 25, 1986, entitled "Confusion Grouping of Strokes in Pattern Recognition Method and System" to Crane et al. also describes an on-line character recognition system that uses template or model strokes and which further provides a distance metric to categorize a stroke as a member of a "confusion group".

U.S. Pat. No. 4,718,102, issued Jan. 5, 1988, entitled "Process and Apparatus Involving Pattern Recognition" to Crane et al. describes a handwritten character recognition system having disambiguation routines to differentiate members of confusion sets of characters (col. 4).

U.S. Pat. No. 4,754,489, issued Jun. 28, 1988, entitled "Means for Resolving Ambiguities in Text Based Upon Character Context" to Bokser describes a context algorithm that assigns a probability value to each member of a set of character strings in order to determine which character string in a set has a highest probability.

Commonly assigned U.S. Pat. No. 4,731,857, issued Mar. 15, 1988, entitled "Recognition System for Run-on Handwritten Characters" to C.C. Tappert describes a segmentation method for run-on handwritten characters that considers all stroke ends as possible character segmentation points.

U.S. Pat. No. 4,491,965, issued Jan. 1, 1985, entitled "Character Recognition Apparatus" to Yoshimura describes character recognition apparatus that provides normalized character patterns to a recognizing section which compares the normalized pattern with entries in a dictionary.

U.S. Pat. No. 4,654,873, issued Mar. 31, 1987, entitled "System and Method for Segmentation and Recognition of Patterns" to Fujisawa et al. describes a character recognition system for use in an optical character reader in which predetermined unit patterns are extracted from a two-dimensional image pattern. If an ambiguity exists in segmentation of the unit patterns, a number of hypothetical unit patterns are provided for the recognition unit for selecting one of the hypothetical unit patterns.

Japanese Patent No. 62-24382 entitled "Method for Recognizing Handwritten Character" describes, in the abstract, a method for recognizing handwritten characters in which input strokes are compared with reference strokes stored in a template memory.

Japanese Patent No. 61-68678 entitled "Optical Input Device of Drawing" describes an optical drawing input device where a symbol on a template is traced and compared to a registered symbol.

What is not taught by this prior art, and what is thus an object of the invention to provide, is method and apparatus for improving or optimizing a set of character prototypes, especially prototypes of character pairs that are known to be readily confusable one with the other.

A further object of the invention is to provide a method, and a means for accomplishing the method, that processes a pair of readily confusable character prototypes so as to emphasize the differences between the characters while also deemphasizing the similarities between the characters.

SUMMARY OF THE INVENTION

The foregoing and other problems are overcome and the objects of the invention are realized by a method of creating character prototypes for improving a recognition accuracy of similarly-shaped characters. The method of the invention operates to emphasize those portions of similarly shaped characters that are known to be critical for discriminating between the similarly shaped characters and to de-emphasize those character portions that are found not to be critical for discrimination purposes.

One method includes a step of entering a character to form a character prototype, the writer writing those portions of the character that are critical for discrimination in a larger fashion than is normal while writing the unimportant features smaller or, for characters having a same feature in common, writing the unimportant feature identically for each of a pair of characters to be discriminated.

In the creation of a starter set of character prototypes graphic techniques are employed to make the unimportant portions of similar characters identical.

Another method employs a graphics tool to copy a trace of a first character. The copied trace is then modified, at a portion critical for differentiating the first character from a confusable second character, to convert the first character to the second character. This technique ensures that similarly formed portions of the two characters are identically formed and that a portion or portions, important for discrimination, are differently formed and are emphasized.

A further method involves an automated caricature process. A first step chooses similar-character prototypes to exaggerate. A second step matches similar character prototypes on a point-to-point basis. A third step computes modified prototypes composed of point pairs that are computed by displacing corresponding pairs of points away from one another by a distance that is proportional to an original distance between the point pairs. This method automatically makes the shapes of the two prototype characters less similar by emphasizing the dissimilar regions.

BRIEF DESCRIPTION OF THE DRAWING

The above set forth and other features of the invention are made more apparent in the ensuing Detailed Description of the Invention when read in conjunction with the attached Drawing, wherein:

FIG. 1 is a simplified block diagram of a handwriting recognition system constructed and operated in accordance with the invention;

FIG. 2 illustrates, by example, two prototype characters associated with a readily confusable character pair and a plurality of differently formed input characters that may be misrecognized;

FIG. 3 illustrates, by example, the prototype characters of FIG. 2 being formed so as to emphasize the differences between the characters and to deemphasize the similarities;

FIG. 4 illustrates, by example, two different character prototype pairs, specifically uppercase "A" and "H" and lower case "h" and "k";

FIG. 5 illustrates the two different character prototype pairs of FIG. 4 that are formed in such as manner as to emphasize the differences between the characters and to deemphasize the similarities;

DETAILED DESCRIPTION OF THE INVENTION

Figure 6:
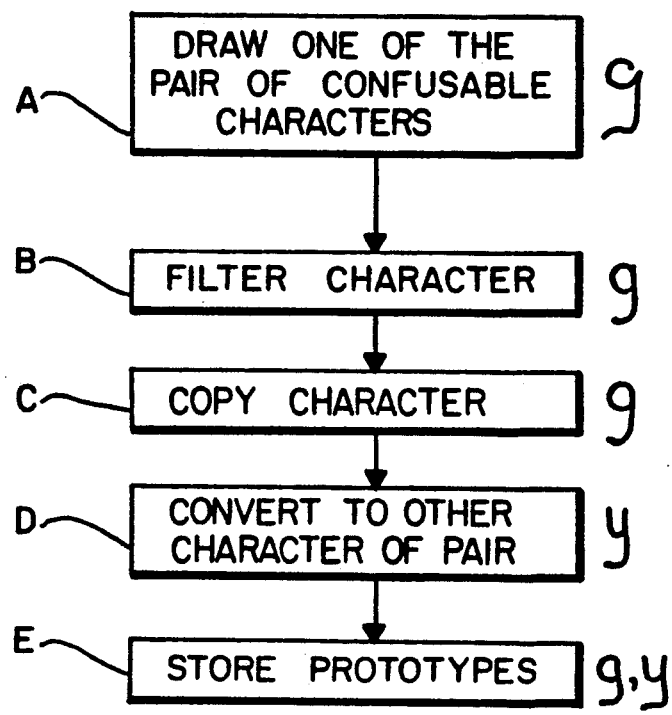
FIG. 6 is a flowchart depicting a first method of the invention and also the effect of the operation of the method on the formation of an exemplary pair of character prototypes.

Referring to FIG. 1 there is shown an on-line handwriting character recognition system 10 constructed and operated in accordance with the invention. System 10 includes a handwriting transducer comprised of an electronic tablet 12 having a writing implement, such as a stylus 14. In response to handwritten characters the transducer outputs a serial stream of (x,y) coordinate pairs corresponding to a position of the stylus 14 relative to a tablet 12 coordinate system. The coordinate pairs are provided to a stroke segmenter 16 that identifies a beginning and an end of discrete handwritten strokes. Strokes are provided to a character matcher 18. Character matcher 18 is coupled to a store 20 of predetermined character prototypes for comparing points of input strokes to points of stored character prototypes so as to identify, to within some probability, that an input stroke or assemblage of strokes represents a specific character. Recognized characters are output from the matcher 18 and may be displayed to a user or input to an application, such as a word processing program. In some systems the functionality of the segmenter 16 and the character matcher 18 may be combined within one handwritten stroke processing unit.

Character prototypes may be provided to the store 20 during a training session held with a user of the system 10. The character prototypes may be entered by a specific user of the system and thereafter used only when the specific user enters handwritten characters. Also, a global or universal set of character prototypes may be generated for use with more than one user.

In this regard a starter prototype set may be designed as an initial prototype set to be used by any writer on first using the system 10. If desired, a writer may then add character prototypes in his/her own writing style to obtain a prototype set tailored to the writer, also referred to as an individualized prototype set. In that a starter prototype set is typically created by an expert in handwriting recognition systems, there is no burden placed on a user of the system 10 to follow any writing suggestions or constraints.

In any case, during a training session characters from character matcher 18 are routed through a physical or logical switch 22 to a prototype processor 24. Prototype processor 24 is also coupled to a user input and output device, such as a keyboard 26 and a display 28, for controlling the operation thereof as will be described in detail below. The output of prototype processor 24 is a series of prototype characters that are supplied to store 20 for subsequent use during a handwriting recognition session conducted with a user of the system 10.

In accordance with the invention there are provided methods of operating the prototype processor 24 so as to create character prototypes for improving the recognition accuracy of similarly-shaped characters.

In general, the methods of the invention operate to emphasize those portions of similarly shaped characters that are found to be critical for discriminating between the similarly shaped characters and to de-emphasize those portions that are found not to be critical for discrimination purposes.

A first method includes a first step of drawing one character of a pair of confusable characters, such as the character "g" of the confusable pair "g,y". The writer intentionally draws those portions of the character that are critical for discrimination in a larger fashion than is normal, while drawing the unimportant features smaller or, for characters having a same feature in common, drawing the unimportant feature identically for each of a pair of characters to be discriminated.

For example, and referring to FIGS. 2 and 3, the descenders, or tails, of the "g" and "y" are not generally considered to be important for the "g-y" discrimination, and the writer is advised to draw them identically so that an unknown character is assigned the same score, by the character matcher 18, when matching against that portion of the prototype characters. However, the upper portion of each of these characters, specifically the closure of the "g" and the open portion of the "y", are considered important for recognition, and the writer is advised to emphasize these elements of the characters, as in FIG. 3.

Prototypes that are created in accordance with this method exhibit a greater percentage of character curves that are devoted to features important for discrimination. For example, recognition of uppercase "O" versus lowercase "o" has been found to improve when the difference in size (diameter) is increased for the upper case "O". Also, and as is seen in FIGS. 4 and 5, "A" versus "H" discrimination was found to improve when the vertical strokes of the "H" were separated more at the top than at the bottom, so as to exaggerate that feature that best distinguishes "H" from "A". Also, discrimination between cursive lowercase "h" and "k" was found to improve markedly when the distinguishing features in these prototypes were drawn in exaggerated fashion. For example, the lower curved portion of the "h" is widened while the cusp of the "k" is intentionally drawn to the left so that it extends past the vertical stroke.

This method has been successfully employed with both starter and individualized prototype sets. In the creation of a starter set, graphic techniques are preferably employed to make the unimportant portions of similar characters identical.

Referring to FIG. 6 there is illustrated in flowchart form a further method of the invention. This method employs a graphics tool, such as a graphics software package known in the art as freelance, to copy the trace of a character and then to graphically modify the important portion so as to convert it to the other character of the confusable-character pair.

In a first step (A) a user draws one of the characters of the confusable character pair, by example a "g" of the pair "g,y".

In a second step (B) the input character is filtered, using the graphics software package, by moving x-y coordinate points of the drawn character to smooth lines, remove aberrant points, and make the character more regular in shape.

In a third step (C) the filtered first character is copied to form a second character. In a fourth step (D) unimportant portions of the first and second characters are made identical, such as the descenders of the g and y. Also, by manually moving points of one or both of the characters the differences between the important features are exaggerated, such as the exaggeration of the closure of the upper portion of the "g" versus the upper, open portion of the "y".

At step E the two prototype characters are stored in the store 20 for subsequent use.

Figure 7:
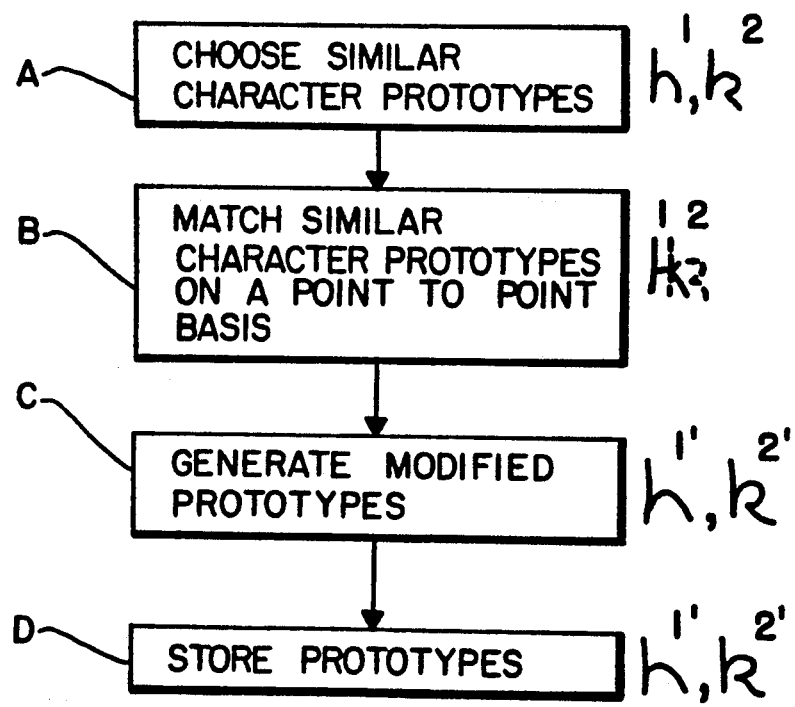
FIG. 7 is a flowchart depicting a second method of the invention and also the effect of the operation of the method on the formation of an exemplary pair of character prototypes.

A further method, illustrated in FIG. 7, employs an automated caricature process to exaggerate the critical differences between handwritten character prototypes. Step A selects a pair of similar-character prototypes, such as "h,k". At step B the similar-character prototypes are matched on a point-to-point basis. Preferably, this matching is accomplished by the character matcher 18 through the use of an elastic matching algorithm of the type discussed by C.C. Tappert in the aforementioned journal article entitled "Adaptive On-Line Handwriting Recognition". The elastic matcher operates to treat one of the characters of the pair as an unknown and the other as a prototype. The characters are elastically deformed so as to achieve a best-fit, characterized as a lowest score, between the characters. This process also results in an alignment of the two characters such that corresponding pairs of points, one from each character, are associated with one another for subsequent processing.

At step C the two similar-character prototypes are processed to move points, in a manner described below, so as to emphasize differences and de-emphasize similarities between the two characters. At step D the generated similar-character prototypes are stored in the store 20 for subsequent use.

Steps B and C may be expressed as a computation executed by the prototype processor 24 as described below.

To match similar-character prototypes 1 and 2 on a point-to-point basis perform the following steps (a)-(d), for all pairs of corresponding points (p1,p2):
 (a) let p1=the point in prototype 1;
 (b) let p2=the point in prototype 2;
 (c) denote a vector drawn from p1 to p2 as (p2-p1);
 (d) compute modified prototypes 1' and 2', comprised of point pairs p1' and p2', respectively, such that
  p1'=p1+k(p1-p2); and
  p2'=p2+k(p2-p1),
using vector addition, with scalar k>0 chosen appropriately.

This technique operates to move corresponding pairs of points (p1,p2) away from one other by a distance proportional to their original distance. This serves to make the shapes of the two prototype characters less similar by emphasizing their dissimilar regions. The scalar k is a caricaturization factor that controls the degree of distortion to create the caricature versions of the writing.

While the invention has been particularly shown and described with respect to a preferred embodiment thereof, it will be understood by those skilled in the art that changes in form and details may be made therein without departing from the scope and spirit of the invention.

We claim:

1. A method of providing character prototypes for use by a handwriting character recognition system, comprising the steps of:

selecting a first handwritten character prototype and a second handwritten character prototype, the first and the second handwritten character prototypes each being comprised of a plurality of points, the first and the second handwritten character prototypes being selected for representing similarly shaped handwritten characters;

matching, with a data processor means, corresponding points between the first character prototype and the second character prototype; and processing, with the data processor means, pairs of matching points to separate one point of the pair from the other point of the pair by an amount proportional to an initial separation between the points of the pair, the step of processing operating to emphasize dissimilarities between the first character prototypes and the second character prototype.

2. A method as set forth in claim 1 wherein the step of matching includes a step of elastically matching the first character prototype with the second character prototype.

3. A method as set forth in claim 1 wherein step of processing includes, for each of a plurality of pairs of corresponding points (p1,p2) that comprise the first handwritten prototype and the second handwritten prototype, the steps of:
 (a) let p1=a point in the first character prototype;
 (b) let p2=a corresponding point in the second character prototype;
 (c) denote as (p2-p1) a vector drawn from p1 to p2; and (d) compute, using vector addition, a modified first character prototype and a modified second character prototype, the modified first character prototype and the modified second character prototype each being comprised of a plurality of points p1' and p2', respectively, such that $p1' = p1 + k(p1-p2)$; and
$p2' = p2 + k(p2-p1)$, where k is chosen to be greater than zero.

4. A method as set forth in claim 3 wherein k is a caricaturization factor having a value selected to control an amount of distortion between the modified first character prototype and the modified second character prototype.

5. A method as set forth in claim 3 and further including a step of storing the modified first character prototype and the modified second character prototype within a store of character prototypes for subsequent use by the handwriting recognition system.

6. Apparatus for providing character prototypes for use by a handwriting character recognition system, comprising:

means for providing a first handwritten character prototype and a second handwritten character prototype, the first and the second handwritten character prototypes each being comprised of a plurality of points, the first and the second handwritten character prototypes being selected for representing similarly shaped handwritten characters;

means for matching corresponding points between the first character prototype and the second character prototype; and means for processing pairs of matching points to separate one point of the pair from the other point of the pair by an amount proportional to an initial separation between the points of the pair, the processing means operating to emphasize dissimilarities between the first character prototype and the second character prototype.

7. Apparatus as set forth in claim 6 wherein the matching means includes means for elastically matching the first character prototype with the second character prototype.

8. Apparatus as set forth in claim 6 wherein the processing means includes computing means that is responsive to each of a plurality of pairs of corresponding points (p1,p2) that comprise the first handwritten prototype and the second handwritten prototype, where p1 is a point in the first character prototype, where p2 is a corresponding point in the second character prototype, and where a vector that is drawn from p1 to p2 is denoted as (p2-p1), the computing means computing a modified first character prototype and a modified second character prototype, each of which is comprised of a plurality of points p1' and p2', respectively, in accordance with $p1' = p1 + k(p1-p2)$; and
$p2' = p2 + k(p2-p1)$, where k is a scalar chosen to be greater than zero.

9. Apparatus as set forth in claim 8 where k is a caricaturization factor having a value selected to control an amount of distortion between the modified first character prototype and the modified second character prototype.

10. Apparatus as set forth in claim 8 and further comprising means for storing the modified first character prototype and the modified second character prototype within a store of character prototypes for subsequent use by the handwriting recognition system.

* * * * *